United States Patent
Watanabe et al.

(10) Patent No.: US 10,211,688 B2
(45) Date of Patent: Feb. 19, 2019

(54) ELECTRIC MACHINE

(71) Applicant: KOMATSU LTD., Minato-ku, Tokyo (JP)

(72) Inventors: Natsuki Watanabe, Hiratsuka (JP); Teiichirou Chiba, Hiratsuka (JP); Yasuhiko Matsuki, Fujisawa (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 230 days.

(21) Appl. No.: 14/889,969

(22) PCT Filed: Jun. 6, 2014

(86) PCT No.: PCT/JP2014/065066
§ 371 (c)(1),
(2) Date: Nov. 9, 2015

(87) PCT Pub. No.: WO2014/171558
PCT Pub. Date: Oct. 23, 2014

(65) Prior Publication Data
US 2016/0301268 A1 Oct. 13, 2016

(51) Int. Cl.
*H02K 1/32* (2006.01)
*H02K 1/27* (2006.01)
(Continued)

(52) U.S. Cl.
CPC ......... *H02K 1/2706* (2013.01); *H02K 1/2766* (2013.01); *H02K 1/32* (2013.01);
(Continued)

(58) Field of Classification Search
CPC .......... H02K 1/2706; H02K 1/32; H02K 9/19; H02K 21/46
See application file for complete search history.

(56) References Cited

U.S. PATENT DOCUMENTS 7,923,881 B2 * 4/2011 Ionel ...................... H02K 1/276
310/156.53
8,674,574 B2 * 3/2014 Hayslett ............... H02K 1/2766
310/156.57
(Continued)

FOREIGN PATENT DOCUMENTS

| CN | 101305510 | 11/2008 |
|---|---|---|
| CN | 103004056 | 3/2013 |

(Continued)

OTHER PUBLICATIONS

Office Action in Japanese Application No. 2013-073365, dated Sep. 27, 2016, 5 pages, with English Translation.
(Continued)

*Primary Examiner* — Dang D Le
(74) *Attorney, Agent, or Firm* — Fish & Richardson P.C.

(57) ABSTRACT

A motor includes: an annular stator attached in a housing; a rotor that is disposed in the stator and is rotatably supported by the housing; and a plurality of permanent magnets embedded in a rotor core of the rotor, in which the rotor core has embedding holes respectively in which the permanent magnets are fitted, and each of the embedding holes is formed with filling holes each continuous in an axial direction of the rotor core at diagonal positions of each of the permanent magnets.

15 Claims, 3 Drawing Sheets

(51) Int. Cl.
*H02K 9/19* (2006.01)
*H02K 21/04* (2006.01)
*H02K 5/20* (2006.01)

(52) U.S. Cl.
CPC .............. *H02K 9/19* (2013.01); *H02K 21/046* (2013.01); *H02K 5/20* (2013.01)

(56) References Cited

U.S. PATENT DOCUMENTS

| | | |
|---|---|---|
| 8,957,560 B2 | 2/2015 | Uchiyama et al. |
| 2007/0052313 A1 | 3/2007 | Takahashi et al. |
| 2009/0026867 A1 | 1/2009 | Haruno et al. |
| 2009/0079287 A1 | 3/2009 | Hattori et al. |
| 2009/0230803 A1 | 9/2009 | Nakayama et al. |
| 2009/0261667 A1 | 10/2009 | Matsubara et al. |
| 2012/0206007 A1 | 8/2012 | Kitagawa et al. |
| 2012/0223607 A1* | 9/2012 | Uchiyama ............ H02K 1/2766 310/156.21 |

FOREIGN PATENT DOCUMENTS

| | | |
|---|---|---|
| EP | 1953896 | 8/2008 |
| EP | 1965484 | 9/2008 |
| EP | 2560267 | 2/2013 |
| JP | 200633982 | 2/2006 |
| JP | 2006/311730 | 11/2006 |
| JP | 2007236020 A | 9/2007 |
| JP | 2007104888 A | 5/2008 |
| JP | 2009268338 | 11/2009 |
| JP | 2009303445 A | 12/2009 |
| JP | 2010178535 | 8/2010 |
| JP | 2012-186889 | 9/2012 |
| JP | 2013-017297 | 1/2013 |
| JP | 2013021811 A | 1/2013 |
| JP | 2014064471 A | 4/2014 |

OTHER PUBLICATIONS

Extended European Search Report from European Application No. 14785383.2, dated Jan. 30, 2017, 11 pages.
Office Action in Japanese Application No. 2013-073365, dated Mar. 28, 2017, 5 pages, with English Translation.
Office Action in Chinese Application No. 201480021841.9, dated Apr. 27, 2017, 14 pages, with English Translation.
International Search Report dated Sep. 9, 2014 from corresponding International Patent Application No. PCT/JP2014/065066, 5 pages.
International Preliminary Report on Patentability dated Dec. 6, 2016 from corresponding International Patent Application No. PCT/JP2014/065066, 11 pages.
Japan Office Action in Japan Application No. 2013-073365, dated Nov. 14, 2017, 8 pages (with English translation).
European Office Action in European Application No. 14785383.2, dated Jun. 19, 2018, 9 pages.

* cited by examiner

ELECTRIC MACHINE

CROSS-REFERENCE TO RELATED APPLICATIONS

This application claims priority to International Application No. PCT/JP2014/065066 filed on Jun. 6, 2014. The contents of the above application are incorporated herein by reference in its entirety.

TECHNICAL FIELD

The present invention relates to a motor, particularly, to an improvement in a fixation structure of a permanent magnet used in a rotor of a permanent magnet-embedded synchronous motor.

BACKGROUND ART

In a typical rotor of a permanent magnet-embedded synchronous motor, it is known that permanent magnets are respectively inserted in a plurality of holes provided to a rotor core and an adhesive is fed in a gap between an outer surface of each of the permanent magnets and an inner surface of each of the holes, thereby fixing the permanent magnets to the rotor core (see, for instance, Patent Literatures 1 and 2).

CITATION LIST(S)

Patent Literatures

Patent Literature 1: JP-A-2007-236020
Patent Literature 2: JP-A-2009-303445

SUMMARY OF THE INVENTION

Problems(s) to be Solved by the Invention

However, since the adhesive is typically fed in a wide range between the outer surface of each of the permanent magnets and the inner surface of each of the holes, a feeding operation of the adhesive adversely requires considerable time and load. Particularly, in Patent Literature 1, since even a flux barrier continuous to the hole is filled with the adhesive, the feeding operation requires extra time, resulting in a poor operation efficiency.

Moreover, the adhesive is typically fed in a part formed near an inner circumference of the rotor core in each of the gaps formed between the holes and the permanent magnets. By this operation, the permanent magnets are pressed toward an outer circumference of the rotor core, so that the permanent magnets are respectively in contact with the inner surfaces of the holes near the outer circumference of the rotor core. Accordingly, no gap is formed near the outer circumference of the rotor core to block filling with the adhesive. Accordingly, the adhesive is fed mainly in the gap formed near the inner circumference of the rotor core. When the filling of the gap with the adhesive is insufficient, a fixation strength of the permanent magnets drastically declines. When a large centrifugal force generated at a large load and a high rotation repeatedly acts on a permanent magnet, the permanent magnet is likely to drop off in the hole.

Moreover, since the adhesive is typically fed by pressure, expensive equipment such as a pump or the like for feeding by pressure is required.

Further, Patent Literatures 1 and 2 fail to describe cooling of the permanent magnets and the rotor core, which may cause an insufficient cooling.

An object of the invention is to provide a motor capable of easily feeding an adhesive and reliably holding a permanent magnet.

Means for Solving the Problem(s)

According to a first aspect of the invention, a motor includes: an annular stator attached in a housing; a rotor that is disposed in the stator and is rotatably supported by the housing; and a plurality of permanent magnets embedded in a rotor core of the rotor, in which the rotor core includes embedding holes respectively in which the permanent magnets are fitted, and each of the embedding holes is formed with filling holes, which are each continuous in an axial direction of the rotor core, at diagonal positions of each of the permanent magnets.

According to a second aspect of the invention, it is desirable that the rotor core includes a flux barrier defined by an end of each of the embedding holes, and the flux barrier defines an oil path through which a cooling oil flows.

According to a third aspect of the invention, it is desirable that the rotor core includes a flux barrier defined by an end of each of the embedding holes, and the flux barrier defines a support that supports each of the permanent magnets.

According to a fourth aspect of the invention, it is desirable that the support is opposite the filling hole across a corner of each of the permanent magnets in a form of a prism.

According to a fifth aspect of the invention, a motor includes: an annular stator attached in a housing; a rotor that is disposed in the stator and is rotatably supported by the housing; and a plurality of cross-sectionally rectangular permanent magnets embedded in a rotor core of the rotor, in which a pair of ones of the permanent magnets, which are disposed in a V-shape seen from an axial center of the rotor, define one magnetic pole, the rotor core includes: embedding holes respectively in which the permanent magnets are fitted; an outer-circumferential flux barrier that is defined by a first end of each of the embedding holes and is positioned near an outer circumference of the rotor core; and an inner flux barrier that is defined by a second end of each of the embedding holes and is positioned on an inner side of each of the embedding holes than the outer-circumferential flux barrier, each of the embedding holes is formed with filling holes, which are each continuous in an axial direction of the rotor core, at diagonal positions of each of the permanent magnets, the inner flux barrier defines an oil path through which a cooling oil flows, the outer-circumferential flux barrier and the inner flux barrier each include a support that supports each of the permanent magnets by contact with a part of an end surface of each of the permanent magnets, and the support is opposite the filling hole across a corner of each of the permanent magnets in a form of a prism.

According to the first aspect of the invention, since each of the permanent magnets is attached to the rotor core only at two of diagonal positions, a feed amount of an adhesive and the like can significantly be reduced and a feeding operation can be conducted rapidly and easily. Moreover, since the permanent magnets are respectively fitted in the embedding holes, even though fixation is made by attachment only at two positions, the fixation can sufficiently withstand centrifugal force generated when the rotor is rotated, so that the permanent magnets can securely be held in the embedding holes.

According to the second aspect of the invention, since the flux barrier is not filled with the adhesive, the flux barrier is reliably usable as an oil path through which a cooling oil flows, so that the permanent magnets and the rotor core can favorably be cooled.

According to the third aspect of the invention, since the support is provided to the flux barrier, the permanent magnets respectively fitted in the embedding holes can more securely be fixed, so that the permanent magnets can more reliably be prevented from dropping off in the respective embedding holes.

According to the fourth aspect of the invention, since the support is opposite the filling hole of the adhesive across the corner of each of the permanent magnets, the filling hole and the support can be formed in a sufficient size at positions where the filling hole and the support do not mutually interfere, so that a fixation strength and durability can be improved.

According to the fifth aspect of the invention, the same advantages as those in the first to the fourth aspects of the invention can be obtained.

DESCRIPTION OF EMBODIMENT(S)

Overall Arrangement of Motor

An exemplary embodiment of the invention will be described below with reference to the drawings.

Figure 1:
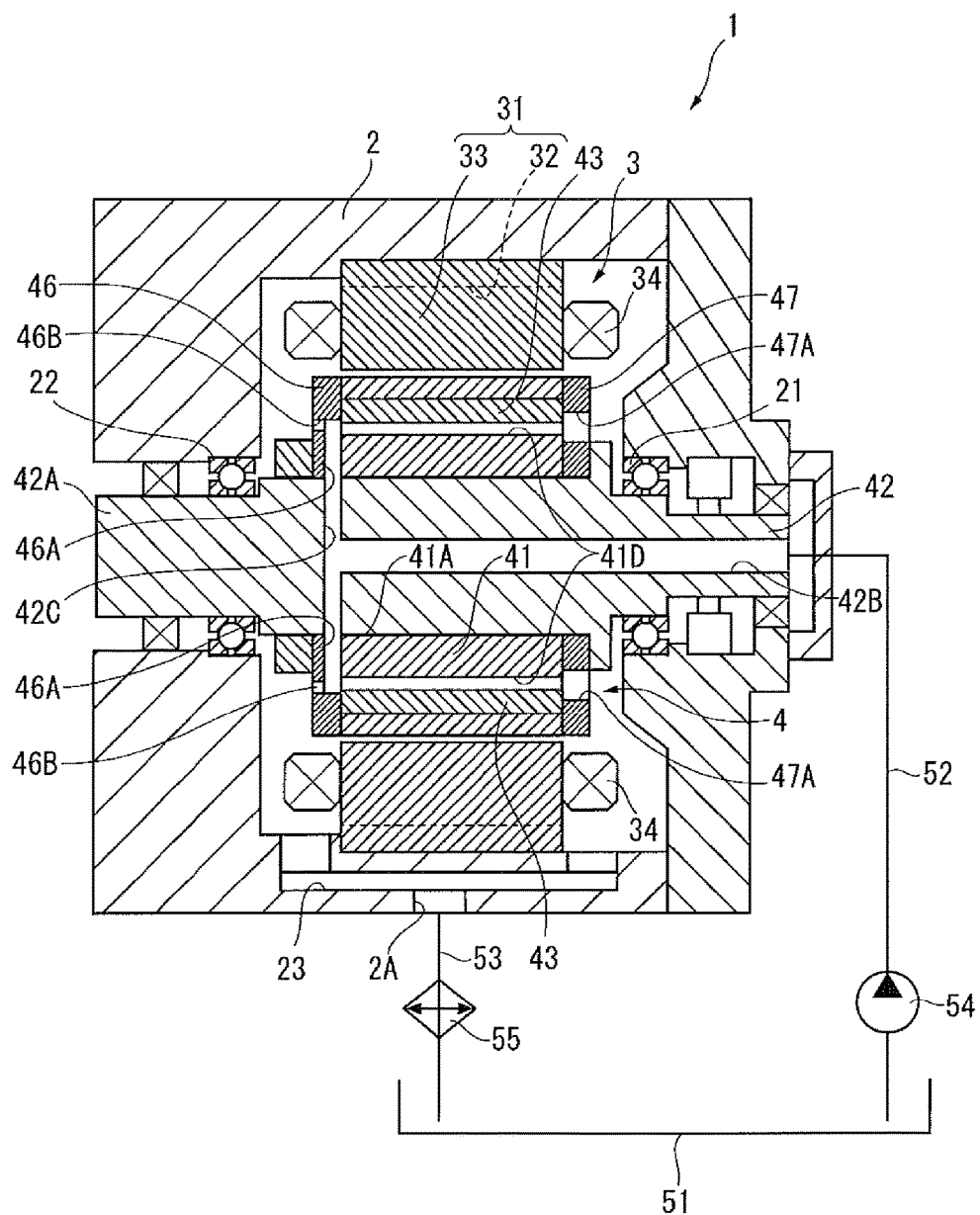
FIG. 1 is a cross sectional view of an entire motor according to an exemplary embodiment of the invention.
Figure 2:
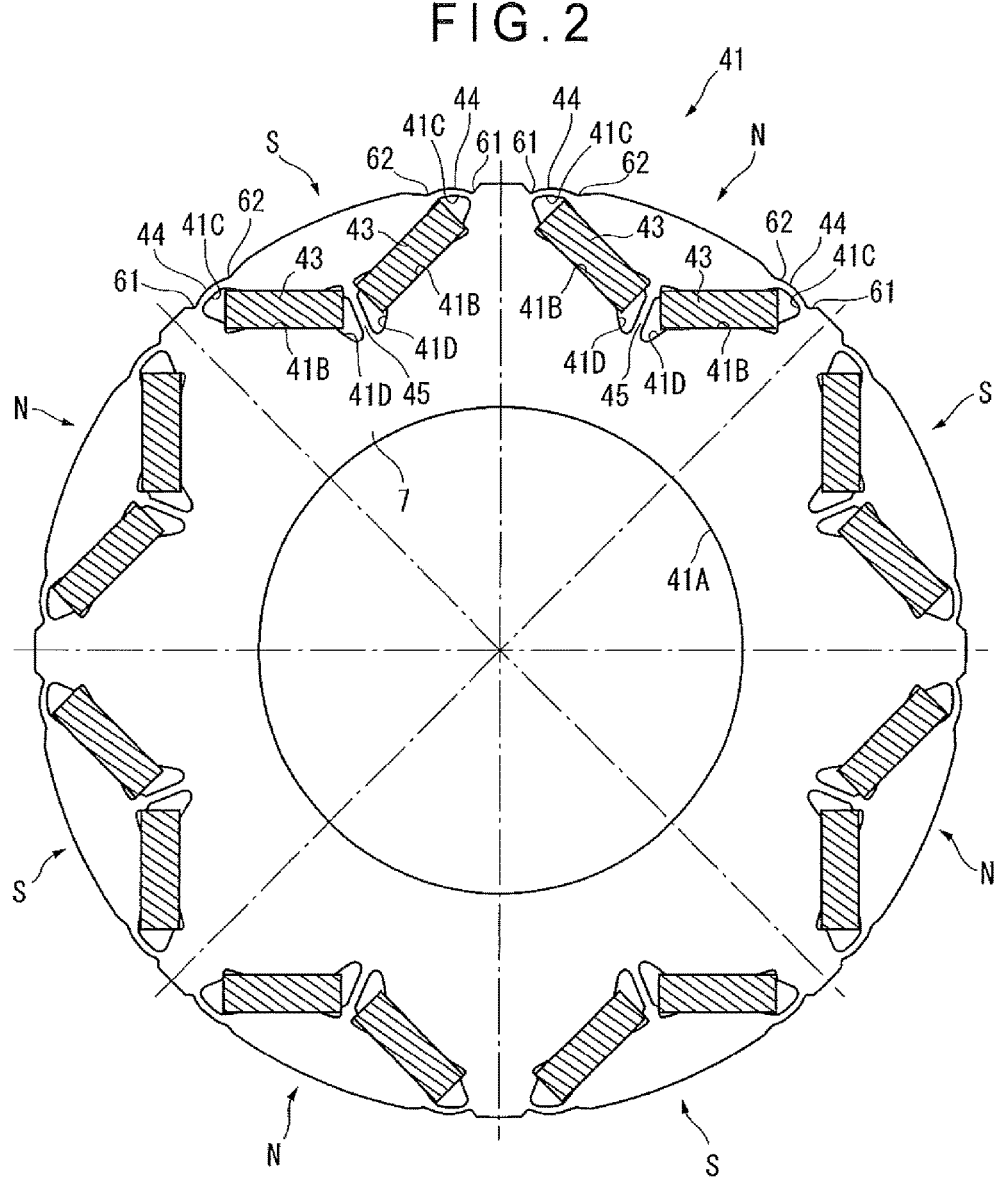
FIG. 2 illustrates a rotor core of the motor.

FIG. 1 is a cross sectional view of an entire motor 1 in the exemplary embodiment. FIG. 2 illustrates a rotor core 41 of the motor 1.

In FIG. 1, the motor 1 includes an annular stator 3 attached in a housing 2 and a rotor 4 disposed in the stator 3 and rotatably supported in the housing 2. The motor 1 is provided in a form of a permanent magnet-embedded synchronous motor in which a permanent magnet 43 is embedded in a rotor core 41 of the rotor 4.

Stator

Although not clearly shown in the drawing, the stator 3 includes a stator core 31 provided by layering a great number of electromagnetic steel plates in an axial direction of the stator 3. The stator core 31 includes a yoke 32 continuous in a circumferential direction on an outer circumference and a plurality of teeth 33 projecting from the yoke 32 toward the rotor 4 in the center of the motor 1. The plurality of teeth 33 are equiangularly formed along the circumferential direction of the yoke 32. An electromagnetic coil 34 is wound around each of the teeth 33.

Rotor

The rotor 4 includes: an annular rotor core 41 provided by layering a great number of electromagnetic steel plates in an axial direction in the same manner as in the stator core 31; a rotor shaft 42 inserted in an insertion hole 41A provided in the center of the rotor core 41; and sixteen permanent magnets 43 in a form of a prism fitted in embedding holes 41B of the rotor core 41 (see FIG. 2).

In FIG. 2, the embedding holes 41B of the rotor core 41 are arranged in a pair to form V-shape so as to be symmetrical seen from an axial center of the rotor core 41. Each of the pairs of the embedding holes 41B is defined as one set.

A pair of permanent magnets 43 respectively embedded in the one set of the embedding holes 41B form one magnetic pole. In other words, the rotor 4 in the exemplary embodiment has eight magnetic poles. Adjacent magnetic poles have mutually different polarity. The magnetic poles are equiangularly formed along a circumferential direction of the rotor core 41.

In the rotor core 41, a first longitudinal end of each of the embedding holes 41B having an opening in a form of an elongated hole defines a flux barrier 41C in a form of space. In the flux barrier 41C, a first one of a pair of end surfaces 43B, 43B on short sides of the cross-sectionally rectangular permanent magnet 43 is positioned (see FIG. 3). Likewise, a second longitudinal end of each of the embedding holes 41B defines a similar flux barrier 41D in which a second end surface 43B of the permanent magnet 43 is positioned. In other words, other than a part of the end surface 43B in contact with supports 71 and 72 described later, a pair of lateral surfaces 43A on long sides of the permanent magnet 43 are in contact with an inner surface of each of the embedding holes 41B (see FIG. 3).

The flux barrier 41C, which is positioned closer to the outer circumference of the rotor core 41 in the flux barriers 41C and 41D, is provided for reducing leakage flux from the permanent magnet 43. The flux barrier 41D, which is positioned on an inner side of the rotor core 41 (i.e., remoter from the outer circumference of the rotor core 41), is provided for reducing the leakage flux from the permanent magnet 43 and as a part of a cooling structure described later. The flux barrier 41C and the outer circumference of the rotor core 41 define a side bridge 44 therebetween. Adjacent ones of the flux barriers 41D near the magnetic pole center define a center bridge 45 therebetween. The side bridge 44 will be described later.

Annular end plates 46 and 47 are attached to both axial ends of the rotor core 41. The end plate 46 attached to a side of the rotor core 41 near the output portion 42A of the rotor shaft 42 (in the left side of FIG. 1) includes an oil path 46A extending in a radial direction of the rotor core 41, the oil path 46A communicating a portion of the rotor core 41 corresponding to the flux barrier 41D with the rotor shaft 42. A discharge hole 46B that is open to an inside of the housing 2 is provided at an end of the oil path 46A. The end plate 47 has a discharge opening 47A at a position corresponding to the flux barrier 41D and communicates the flux barrier 41D with the inside of the housing 2. It should be noted that, although the motor 1 in the exemplary embodiment is disposed horizontal so that the axial direction of the rotor shaft 42 is substantially horizontal, the motor of the invention may be disposed vertical so that the axial direction of the rotor shaft is substantially vertical. When the motor is vertically disposed, the discharge hole 46B may be omitted.

An oil path 42B that is open to the opposite of the output portion 42A and extends in the axial direction toward the output portion 42A is provided in the center of the rotor shaft 42. An end of the oil path 42B near the output portion 42A communicates with the oil path 42C penetrating in the radial direction. The oil path 42C communicates with the oil path 46A of the end plate 46.

The permanent magnet 43 is preferably exemplified by a rare-earth permanent magnet of, for instance, neodymium and dysprosium. The permanent magnet 43 is fixed with an adhesive while being fitted in the embedding hole 41B of the rotor core 41. A fixation structure of the permanent magnet 43 will be described below.

Cooling Structure

In the motor 1, the temperatures of the stator core 31, the electromagnetic coil 34, the rotor core 41 and the permanent magnet 43 become high by heat caused by hysteresis loss and eddy-current loss. Accordingly, in the exemplary embodiment, a cooling oil is circulated between the inside of the housing 2 and an exterior cooling oil tank 51, thereby cooling the motor 1.

In the above structure, a supply flow path 52 is connected from the cooling oil tank 51 to the opening side of the oil path 42B of the rotor shaft 42 in the motor 1. A drain flow path 53 leading to the cooling oil tank 51 is connected to a drain hole 2A provided on the bottom of the housing 2 in the motor 1. A hydraulic pump 54 is provided in the supply flow path 52. An oil cooler 55 is provided in the drain flow path 53.

The cooling oil sucked from the cooling oil tank 51 by the hydraulic pump 54 flows into the oil path 42B of the rotor shaft 42 to flow through a first end to a second end of the oil path 42B in the axial direction, thereby passing through the oil path 42C radially provided to the second end to flow into the oil path 46A of the end plate 46.

A part of the cooling oil flowing in the oil path 46A is injected into the housing 2 from the discharge hole 46B to cool the rotor core 41 and the electromagnetic coil 34. The rest of the cooling oil flowing in the oil path 46A flows into the flux barrier 41D of the rotor core 41 to flow within the flux barrier 41D in the axial direction, thereby cooling the rotor core 41 and the permanent magnet 43. The cooling oil after flowing through the flux barrier 41D is injected into the housing 2 from the discharge opening 47A of the end plate 47 to also cool the rotor core 41 and the electromagnetic coil 34.

The cooling oil injected from the discharge hole 46B and the discharge opening 47A cools bearings 21 and 22 that rotatably support the rotor shaft 42, in addition to cooling the rotor core 41 and the electromagnetic coil 34. After cooling the rotor core 41, the electromagnetic coil 34 and the bearings 21 and 22, the cooling oil drops in the housing 2 to be accumulated in an oil reservoir 23 at the bottom of the housing 2. The accumulated cooling oil flows from the oil reservoir 23 through the drain hole 2A to flow through the drain flow path 53. After being cooled in the oil cooler 55, the cooling oil returns to the cooling oil tank 51.

Side Bridge

Figure 3:
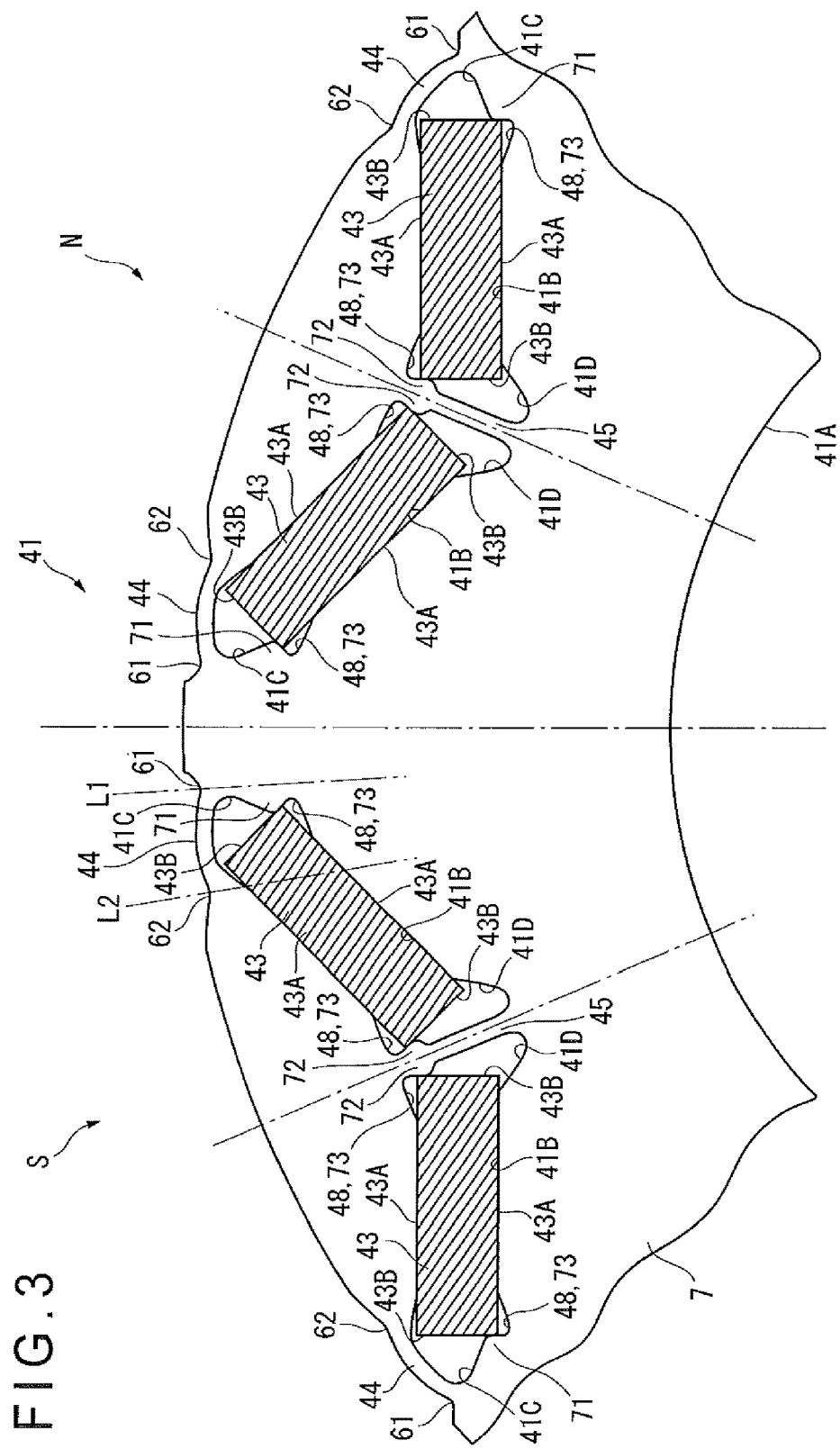
FIG. 3 is an enlarged view of a relevant part of the rotor core.

FIG. 3 is an enlarged view of a relevant part of the rotor core 41. FIG. 3 shows adjacent two magnetic poles.

As shown in FIG. 3, a first recess 61 and a second recess 62 that are dented inward are provided on the outer circumference of the rotor core 41 near the flux barrier 41C positioned close to the outer circumference. In each of the magnetic poles, the first recesses 61 are positioned on an outer side in the circumferential direction from the magnetic pole center and the second recesses 62 are positioned on an inner side in the circumferential direction from the magnetic pole center. A distance in the circumferential direction between the first recess 61 and the second recess 62 is substantially equal to a distance across the flux barrier 41C in the circumferential direction. Specifically, provided that a line connecting the first recess 61 and the axial center of the rotor core 41 is denoted by L1 and a line connecting the second recess 62 and the axial center of the rotor core 41 is denoted by L2, the flux barrier 41C is provided between the lines L1 and L2. As a result, a thin portion between the flux barrier 41C and the outer circumference of the rotor core 41 defines the side bridge 44 connecting the first recess 61 and the second recess 62.

The side bridge 44 has a substantially uniform thickness (i.e., thickness in the radial direction) in the circumferential direction of the rotor core 41 in relation to the opening form of the flux barrier 41C and is formed in a curved arch projecting outward in the radial direction of the rotor core 41. In other words, the first recess 61 and the second recess 62 are respectively formed on the base ends of the arch-shaped side bridge 44. A curvature radius of the side bridge 44 is smaller than a radius of the outer circumference of the rotor core 41.

In a such shaped side bridge 44, stress concentrates by centrifugal force in conjunction with the rotation of the rotor 4, on both the ends and the center of the side bridge 44 in the circumferential direction. Specifically, the stress generates in a dispersed manner on three points of the bottom of each of the first recess 61 and the second recess 62 and an inner surface of the side bridge 44 (flux barrier 41C). Accordingly, the stress does not concentrate on a single point, so that the stress generating in each point can be reduced to improve durability. Among the first recess 61 and the second recess 62, particularly in the exemplary embodiment, the second recess 62 can serve as a portion for reducing torque pulsation, iron loss, flux harmonic or cogging torque, thereby providing favorable characteristics of the motor 1.

Fixation Structure of Permanent Magnet

The fixation structure of the permanent magnet 43 will be described below with reference to FIG. 3.

As shown in FIG. 3, the supports 71 and 72 respectively projecting toward two of diagonal positions of the permanent magnet 43 are respectively provided to portions forming the flux barriers 41C and 41D in a steel plate 7. The support 71 of the flux barrier 41C is in contact with an edge of the first end surface 43B of the permanent magnet 43, the edge being remoter from the outer circumference of the rotor core 41. The support 72 of the flux barrier 41D is provided at an outer base end of the center bridge 45 and is in contact with an edge of the second end surface 43B of the permanent magnet 43, the edge being closer to the outer circumference of the rotor core 41. Thus, the permanent magnet 43 is supported by the rotor core 41 at two of diagonal positions on the edges of the opposing short sides.

Herein, it is desirable that a contact width of each of the supports 71 and 72 in contact with the end surfaces 43B of the permanent magnet 43 is shorter than a substantially ⅕ (one fifth) of a whole width of the short sides of the permanent magnet 43 on which the end surfaces 43B are provided. The contact width shorter than ⅕ of the whole width can reduce the leakage flux from the end surfaces 43B. Moreover, the contact positions of the supports 71 and 72 with the respective end surfaces 43B may be away from the widthwise ends of the end surface 43B (corners of the permanent magnet 43).

A portion of the steel plate 7 defining the embedding hole 41B further defines an extended portion 73 at an opposite position from each of the supports 71 and 72 across a corner of the permanent magnet 43. The extended portion 73 is provided by extending a part of the embedding hole 41B in order to form a small gap between the steel plate 7 and the lateral surface 43A of the permanent magnet 43. Moreover, the extended portion 73 is provided in all the steel plates 7 to be layered. All the steel plates 7 to be layered have the same shape. By positioning the steel plates 7, the embedding hole 41B mutually communicating in a layered direction (which is the same as the axial direction of the rotor core 41) is formed, so that the permanent magnet 43 can be inserted into the embedding hole 41B.

Moreover, all the extended portions 73 mutually communicating in the layered direction define a filling hole 48 that penetrates the rotor core 41 in the axial direction. The filling hole 48 is provided to the embedding hole 41B at two of diagonal positions of the permanent magnet 43. In other words, the filling hole 48 is formed between the permanent magnet 43 and the extended portion 73 while the permanent magnet 43 is inserted in the embedding hole 41B. By filling the axially continuous filling hole 48 with the adhesive, edges at two diagonal positions of the opposing long sides of the permanent magnet 43 are fixed to the rotor core 41. It should be noted that a resin material such as a mold material may be used as the adhesive.

Accordingly, in the exemplary embodiment, it is not necessary to apply the adhesive to the entire lateral surfaces 43A of the permanent magnet 43 for fixation, so that time and load for feeding the adhesive can significantly be reduced and an assembly operation can easily be conducted. The permanent magnet 43 is fitted in the embedding hole 41B, in which both of the lateral surfaces 43A of the permanent magnet 43 are in contact with the inner surface of the embedding hole 41B. Accordingly, even with a small feed amount of the adhesive, the permanent magnet 43 can securely be held in the embedding hole 41B.

Modification(s)

It should be understood that the scope of the invention is not limited to the above-described exemplary embodiment but includes modifications and improvements as long as the modifications and improvements are compatible with the invention.

For instance, in the exemplary embodiment, the filling hole 48 is formed along the axial direction of the rotor core 41. However, a communication portion that communicates the filling hole 48 with each of the flux barriers 41C and 41D may further be provided. With this arrangement, air in the filling hole 48 can be removed through the communication portion, thereby facilitating feeding the adhesive in the filling hole 48.

Even when such a communication portion is not provided, in order to smoothly feed the adhesive, for instance, a cross section of the filling hole 48 formed by the extended portion 73 may be enlarged so that a needle for feeding the adhesive can be inserted into the filling hole 48. After such a needle is inserted into the farthest side of the filling hole 48, the adhesive is fed through the needle while the needle is retracted from the farthest side to the near side.

Alternatively, the adhesive can be fed in a process before the end plates 46 and 47 are provided to the rotor core 41, in other words, in an open state of the ends of the filling hole 48.

Further, even in a process after the end plates 46 and 47 are provided to the rotor core 41, for instance, air may be removed through the communication hole when feeding the adhesive by forming on the end plate 46 in advance a communication hole that communicates the filling hole 48 with the outside.

In the above exemplary embodiment, the first recess 61 and the second recess 62 are provided on the outer circumference of the rotor core 41. However, the invention encompasses an arrangement in which only the second recess 62 functioning so as to improve characteristics of the motor 1 is provided and the first recess 61 is omitted and an arrangement without the first recess 61 and the second recess 62.

The invention claimed is:

1. A motor comprising:
an annular stator attached in a housing;
a rotor that is disposed in the stator and is rotatably supported by the housing; and
a plurality of permanent magnets embedded in a rotor core of the rotor, wherein the rotor core defines embedding holes in which the permanent magnets are respectively fitted,
each of the embedding holes forms filling holes that are configured to be filled with an adhesive, the filling holes extending continuously in an axial direction of the rotor core at diagonal positions of each of the permanent magnets, and
the rotor core further comprises a flux barrier, the flux barrier being in a form of an empty space that is defined by each of the embedding holes.

2. The motor according to claim 1, wherein
the flux barrier is defined by an end of each of the embedding holes, and
the flux barrier defines an oil path through which a cooling oil flows.

3. The motor according to claim 1, wherein
the flux barrier is defined by an end of each of the embedding holes, and
the flux barrier defines a support that supports each of the permanent magnets, the support projecting toward each of the diagonal positions of each of the permanent magnets.

4. The motor according to claim 3, wherein
the support is opposite the filling hole across a corner of each of the permanent magnets in a form of a prism.

5. The motor according to claim 1, wherein
the filling holes are filled with an adhesive that fixes each of the permanent magnets to the rotor core.

6. The motor according to claim 1, wherein
the adhesive comprises a resin material.

7. The motor according to claim 1, wherein
each of the filling holes abuts a lateral surface on a long side of each of the permanent magnets.

8. The motor according to claim 1, wherein
the flux barrier faces a portion of a short side of each of the permanent magnets and a portion of a long side of each of the permanent magnets.

9. The motor according to claim 1, wherein,
the rotor core comprises supports respectively provided at positions opposing short sides of each of the permanent magnets fitted in the respective embedding holes, the supports being in contact with the short sides of each of the permanent magnets.

10. The motor according to claim 9, wherein
each support contacts one of the short sides of each of the permanent magnets, and divides the corresponding embedding hole into the filling hole and the flux barrier.

11. The motor according to claim 9, wherein
each support is positioned between the flux barrier and the filling hole of each of the permanent magnets fitted in the respective embedding holes.

12. A motor comprising:
an annular stator attached in a housing;
a rotor that is disposed in the stator and is rotatably supported by the housing; and
a plurality of cross-sectionally rectangular permanent magnets embedded in a rotor core of the rotor, wherein
a pair of ones of the permanent magnets, which are disposed in a V-shape seen from an axial center of the rotor, define one magnetic pole, the rotor core comprises:
- embedding holes respectively in which the permanent magnets are fitted;
- an outer-circumferential flux barrier that is defined by a first end of each of the embedding holes and is positioned near an outer circumference of the rotor core; and
- an inner flux barrier that is defined by a second end of each of the embedding holes and is positioned on an inner side of each of the embedding holes than the outer-circumferential flux barrier, each of the embedding holes is formed with filling holes, which are each continuous in an axial direction of the rotor core, at diagonal positions of each of the permanent magnets, the inner flux barrier defines an oil path through which a cooling oil flows, the outer-circumferential flux barrier and the inner flux barrier each comprise a support that supports each of the permanent magnets by contact with a part of an end surface of each of the permanent magnets, and the support is opposite the filling hole across a corner of each of the permanent magnets in a form of a prism.

13. The motor according to claim 12, wherein
the filling holes are filled with an adhesive that fixes each of the permanent magnets to the rotor core.

14. The motor according to claim 13, wherein
the adhesive comprises a resin material.

15. The motor according to claim 12, wherein
each of the filling holes abuts a lateral surface on a long side of each of the permanent magnets.

* * * * *